(12) United States Patent
Anshu (10) Patent No.: US 10,908,860 B1
(45) Date of Patent: Feb. 2, 2021

(54) MULTI-FUNCTION PRINTER (MFP) FOR EXECUTING MULTIPLE JOBS

(71) Applicant: TOSHIBA TEC KABUSHIKI KAISHA, Tokyo (JP)

(72) Inventor: Shubham Krishna Anshu, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/570,725

(22) Filed: Sep. 13, 2019

(30) Foreign Application Priority Data

Jul. 15, 2019 (IN) .............................. 201941028305

(51) Int. Cl.
*H04N 1/00* (2006.01)
*G06F 3/12* (2006.01)

(52) U.S. Cl.
CPC .......... *G06F 3/1263* (2013.01); *G06F 3/1205* (2013.01); *G06F 3/1207* (2013.01); *G06F 3/1268* (2013.01)

(58) Field of Classification Search
CPC .... G06F 3/1236; G06F 3/1205; G06F 3/1207; G06F 3/1268

USPC ....................................................... 358/1.15
See application file for complete search history.

(56) References Cited

U.S. PATENT DOCUMENTS

2011/0134476 A1* 6/2011 Takashima ............ G06F 3/1212
358/1.15

FOREIGN PATENT DOCUMENTS

JP H10-105001 A 4/1998

* cited by examiner

*Primary Examiner* — Saeid Ebrahimi Dehkordy
(74) *Attorney, Agent, or Firm* — Foley & Lardner LLP (57) ABSTRACT

Embodiments of the present disclosure relate to a method and a Multi-Function Printer (MFP) for executing multiple jobs. The MFP receives a single request comprising one or more inputs for executing a plurality of jobs. Also, one or more setting parameters for each job is received. The MFP stores the one or more inputs in a memory associated with the MFP and executes the plurality of jobs. The plurality of jobs is executed such that a job subsequent to a previously executed job, is executed continuously without receiving user inputs after completion of the previously executed job. Also, the one or more setting parameters are applied while executing to corresponding jobs.

20 Claims, 6 Drawing Sheets

| Job No | Job Name | Settings | Priority |
|---|---|---|---|
| 1 | Scan | 3 pages | 2 |
| 2 | Print | 5 pages | 1 |
| 3 | Fax | 1 pages | 3 |

Figure 5A

| Job No | Job Name | Settings | Priority |
|---|---|---|---|
| 1 | Print | 3 page, Color, Vertical | 1 |
| 2 | Print | 3 page, B/W, Vertical | 2 |
| 3 | Print | 4 page, B/W, Horizontal | 3 |

Figure 5B

MULTI-FUNCTION PRINTER (MFP) FOR EXECUTING MULTIPLE JOBS

TECHNICAL FIELD

The present disclosure relates to Multi-Function Printer (MFP). More particularly, but not specifically, the present disclosure relates to a method and MFP for executing multiple jobs.

BACKGROUND

Currently, Multi-Function Printers (MFPs) are used abundantly in enterprises and commercial domains. MFPs have the capability of performing a plurality of jobs such as a print job, a scan job, a facsimile job and a copy job. Existing MFPs provide options to users to apply a plurality of settings to each job. For example, print color, scaling, margins, and the like.

In the existing MFPs, a user can execute one or more jobs sequentially by providing inputs and instructions after completion of each job. For example, if the user has to scan a document and thereafter photocopy the document, the user has to provide an instruction to scan the document and after completion of scan job, the user has to provide another instruction for photocopying the document. In enterprises where the MFPs are abundantly used, users have to wait for an engaged user to complete his/her ongoing task on the MFP. Further, a user having different jobs to perform on the MFP has to wait for each individual job to be completed and thereafter provide instructions for subsequent jobs. For example, if a user has to scan a 100-page document to email and thereafter photocopy the 100-page document, the user has to provide a first instruction for scanning the document and thereafter when the scan job is completed, the user has to provide a new instruction for photocopying the document.

Currently, when multiple users approach an MFP, the users have to be queued to operate the MFP while the MFP is operated by another user. Therefore, the existing MFPs are cumbersome to operate while multiple jobs need to be executed and when multiple users need to operate the MFPs.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, a method for executing multiple jobs in a Multi-Function Printer (MFP) is disclosed. The method comprises receiving (a) a single request comprising one or more inputs for executing a plurality of jobs and (b) one or more setting parameters for each of the plurality of jobs. The method further comprises executing the plurality of jobs such that each job subsequent to a previously executed job in the plurality of jobs is executed continuously without receiving user inputs after completion of the previously executed job. In an embodiment, the one or more setting parameters are applied while executing corresponding jobs.

In an embodiment, a Multi-Function Printer (MFP) is disclosed. The MFP comprises a user interface, a memory and a processor. The user interface is configured to receive (a) a single request comprising one or more inputs and (b) one or more setting parameters for executing a plurality of jobs. The memory is configured to store the plurality of jobs to be executed and corresponding one or more setting parameters. The processor is configured to execute the plurality of jobs such that each job subsequent to a previously executed job in the plurality of jobs is executed continuously without receiving user inputs after completion of the previously executed job. In an embodiment, the one or more setting parameters are applied while executing corresponding jobs.

In an embodiment, a non-transitory computer readable medium includes instructions stored thereon that when processed by at least one processor cause a device to perform operations. The operations comprise receiving (a) a single request comprising one or more inputs for executing a plurality of jobs and (b) one or more setting parameters for each of the plurality of jobs. The operations further comprise executing the plurality of jobs such that each job subsequent to a previously executed job in the plurality of jobs is executed continuously without receiving inputs after completion of the previously executed job. In an embodiment, the one or more setting parameters are applied while executing corresponding jobs.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises," "comprising," or any other variations thereof, are intended to cover a non-exclusive inclusion, such that a setup, device or method that comprises a list of components or steps does not include only those components or steps but may include other components or steps not expressly listed or inherent to such a setup, device or method. In other words, one or more elements in a system or apparatus proceeded by "comprises . . . a" does not, without more constraints, preclude the existence of other elements or additional elements in the system or apparatus.

Embodiments of the present disclosure relate to a method and a Multi-Function Printer (MFP) for executing multiple jobs. The MFP receives one or more inputs for executing a plurality of jobs. Also, one or more setting parameters for each job is received. The MFP stores the one or more inputs in a memory associated with the MFP and executes the plurality of jobs. The plurality of jobs is executed such that a job subsequent to a previously executed job, is executed continuously without receiving user inputs after completion of the previously executed job. Also, the one or more setting parameters are applied while executing to corresponding jobs.

Figure 1A:
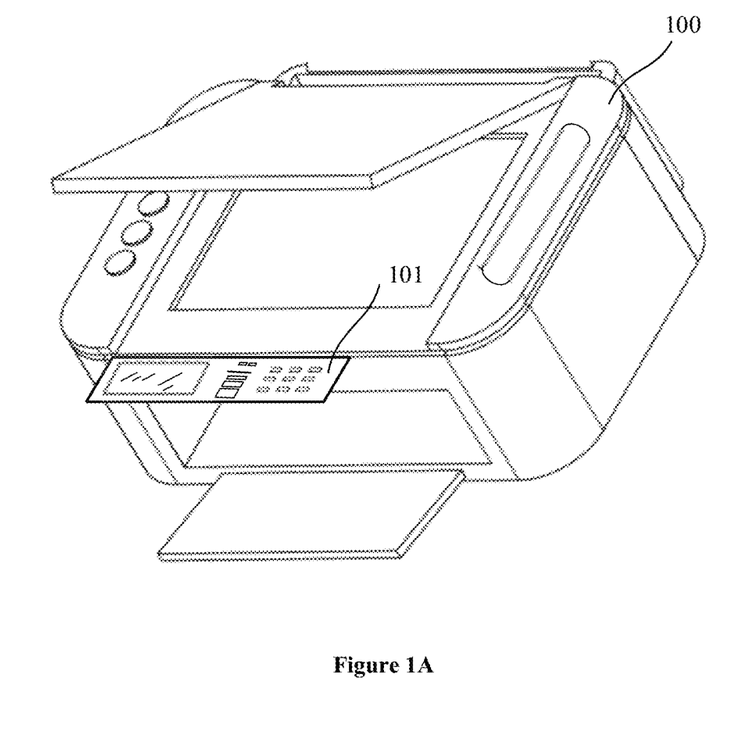
FIG. 1A is an illustration of a Multi-Function Printer (MFP), in accordance with some embodiments of the present disclosure.
Figure 1B:
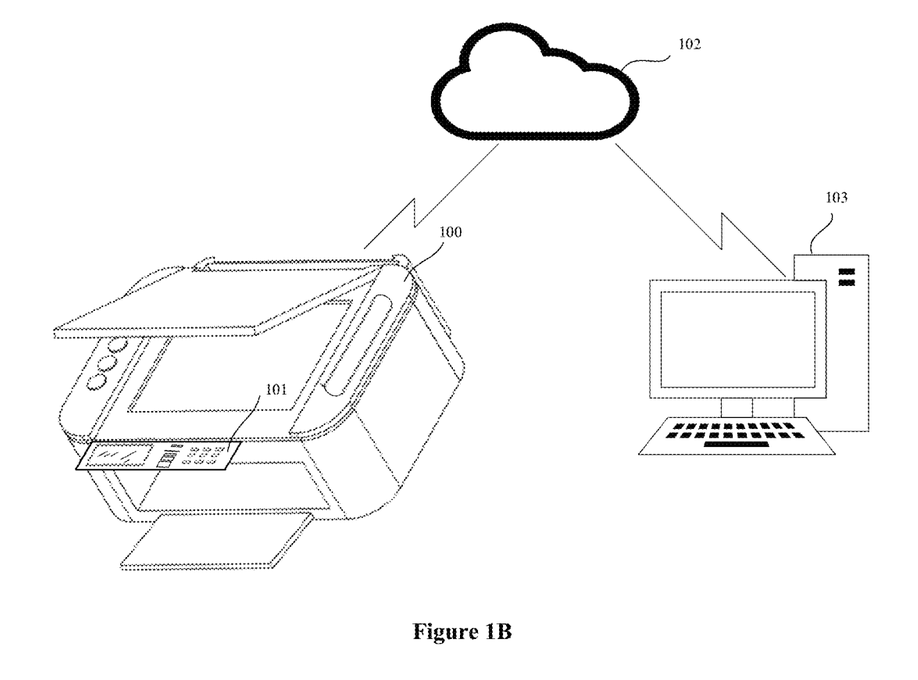
FIG. 1B is an illustration of network connection of a Multi-Function Printer (MFP), in accordance with some embodiments of the present disclosure.

FIG. 1A is an illustration of a Multi-Purpose Printer (MFP) (100). The MFP (100) may be a home printer, a corporate printer or any other printer which is capable of performing a plurality of jobs/tasks including at least a print job, a scan job, a photocopy (also referred as copy) job or a facsimile (also referred as fax) job. The MFP (100) may comprise but is not limited to, a printing module (not shown in FIG. 1A) and a scanning module (not shown in FIG. 1A), and a facsimile module (not shown in FIG. 1A) for performing the plurality of jobs. The MFP (100) may be connected to a network (102) as shown in FIG. 1B. In an embodiment, the MFP (100) may be disposed in communication with one or more input/output (I/O) devices (103) via I/O interface (not shown). The I/O interface may employ communication protocols/methods such as, without limitation, audio, analog, digital, monoaural, RCA, stereo, IEEE®-1394, serial bus, universal serial bus (USB®), infrared, PS/2, BNC, coaxial, component, composite, digital visual interface (DVI), high-definition multimedia interface (HDMI®), RF antennas, S-Video, VGA, IEEE® 802.n/b/g/n/x, Bluetooth®, cellular (e.g., code-division multiple access (CDMA), high-speed packet access (HSPA+), global system for mobile communications (GSM™), long-term evolution (LTE™), WiMax™, or the like), etc.

In an embodiment, the I/O device (103) can include but is not limited to a mobile, a personal computer, a laptop, a Personal Digital Assistant (PDA), a tablet, a server, and the like. In an embodiment, the I/O device (103) can host an application for controlling operations of the MFP (100).

In an embodiment, the MFP (100) comprises a User Interface (UI) (101) for operating the MFP (100). The UI (101) is also referred as panel in the present disclosure. The UI (101) may comprise at least a touch panel, a keypad, a microphone, a speaker or a display unit.

Figure 2:
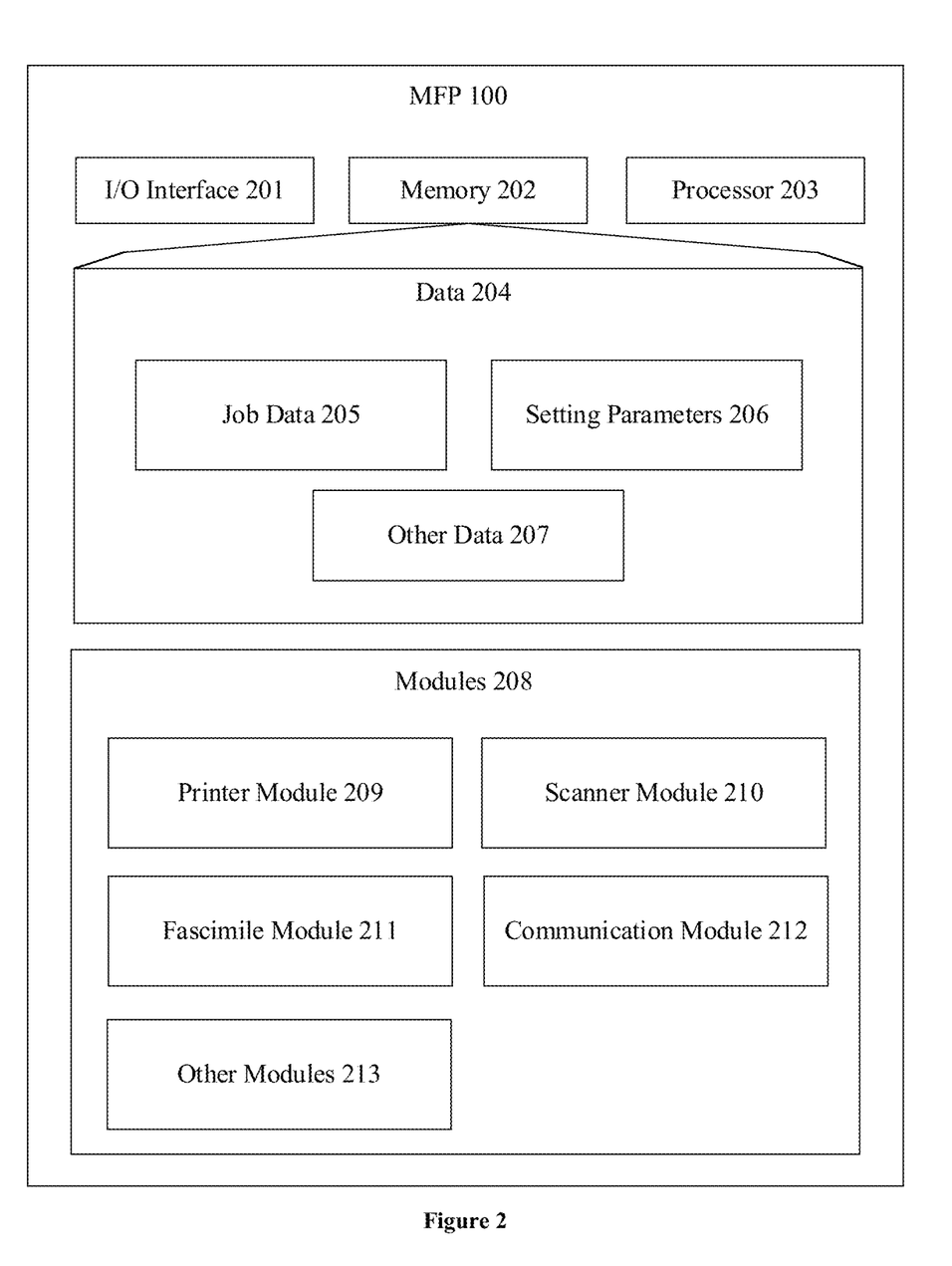
FIG. 2 is an illustration of internal architecture of a Multi-Function Printer (MFP) for executing multiple jobs, in accordance with some embodiments of the present disclosure.

FIG. 2 illustrates internal architecture of the MFP (100), in accordance with an embodiment of the present disclosure. The MFP (100) may include at least one central processing unit (CPU) or processor (203) and a memory (202) storing instructions executable by the at least one processor (203). The processor (203) may comprise at least one data processor for executing program components for executing user or system-generated requests. The memory (202) is communicatively coupled to the processor (203). The MFP (100) further comprises an Input/Output (I/O) interface (201). The I/O interface (201) is coupled with the processor (203) through which an input signal or/and an output signal is communicated. The processor (203) may be disposed in communication with one or more input/output (I/O) devices (103) via the I/O interface (201).

In an embodiment, one or more data (204) may be stored within the memory (202). The one or more data (204) may include, for example, job data (205), setting parameters (206) and other data (207).

In an embodiment, the job data (205) includes the plurality of jobs to be executed. When the user provides the one or more inputs for executing the plurality of jobs, the plurality of jobs is stored as job data (205) in the memory (202). In a further embodiment, the job data (205) may include a priority associated with each job. For example, the user may select two jobs (scan to email and copy) and the user may provide a higher priority for the copy. The job data (205) may associate the priority provided to each job while storing in the memory (202).

In an embodiment, the setting parameters (206) include parameters associated with each job. In one embodiment, the one or more setting parameters (206) associated with a print job comprises at least one of a number of pages to be printed, print color (e.g., color or black and white), print scaling, print margins, print orientation (e.g., horizontal or vertical), or a number of copies. In one embodiment, the one or more setting parameters (206) associated with a facsimile job comprises at least one of a number of pages to be faxed, a facsimile address (e.g., a recipient address to which scanned data will be communicated), or a number of copies. In one embodiment, the one or more setting parameters (206) associated with the scan comprises at least one of a number of pages to be scanned, a file location, an email address (e.g., to which a scanned document will be communicated), or cloud details (e.g., information identifying a cloud device, such as a cloud server, to which a scanned document will be communicated).

In an embodiment, the other data (207) may include notification indications. The user may select a type of indication for each job. After completion of each job, a corresponding indication may be provided. For example, the user may select a sound indication for print job and a light indication for scan job. When the print job is completed, the sound indication is provided, and when the scan job is completed, the light indication is provided.

In an embodiment, the one or more data (204) in the memory (202) is processed by modules (208) of the MFP (100). As used herein, the term module refers to an Application Specific Integrated Circuit (ASIC), an electronic circuit, a Field-Programmable Gate Array (FPGA), a Programmable System-on-Chip (PSoC), a combinational logic circuit, and/or other suitable components that provide the described functionality. The said modules (208) when configured with the functionality defined in the present disclosure will result in a novel hardware.

In one implementation, the modules (208) may include, for example, a printer module (209), a scanner module (210), a facsimile module (211), a communication module (212), and other modules (213). It will be appreciated that such aforementioned modules (208) may be represented as a single module or a combination of different modules.

In an embodiment, the scanner module (210) is configured to scan a document placed in a dedicated slot (e.g., a scan area) in the MFP (100). The scanner module (210) may receive the one or more setting parameters (206) associated with the scan job. The scanner module (210) may scan the document according to the one or more setting parameters (206). In an embodiment, the scanned document may be stored in the memory (202) or can be communicated to the I/O device (103) or can be communicated to a server (e.g., an email server).

In one implementation, the printer module (209) is configured to print a document upon receiving instructions. In an embodiment, the printer module (209) may print the document stored in the memory (202) or a document stored in a network server (not shown) or a document stored in the I/O device (103) connected to the MFP (100). For example, a document can be stored in the memory (202) of the MFP (100) and can be printed any time. A user may be prompted to select one or more documents stored in the memory (202) for printing. In another example, a document can be stored in a network server connected to the MFP (100). In another example, the I/O device (103) such as a Universal Serial Bus (USB) or a computer can be connected to the MFP (100). One or more documents stored in the I/O device (103) can be printed by providing instructions from the I/O device (103). An application running on the I/O device (103) can be used to provide instructions to the MFP (100). In an embodiment, the printer module (209) may print the document according to the one or more setting parameters (206) associated with the print job. In an embodiment, the printer module (209) and the scanner module (210) may be used together for performing the copy job.

In an embodiment, the facsimile module (211) is configured to send and receive faxes. In an embodiment, the facsimile module (211) may receive a recipient address from the user via the UI (101). In an embodiment, the facsimile module (211) may be used together with the scanner module (210) to complete the fax job.

In an embodiment, the communication module (212) is configured to enable data exchange between the modules (208). For example, during a copy job, the communication module (212) provides the scanned data from the scanner module (210) to the printer module (209) for completing the copy job. Likewise, during a fax job, the communication module (212) provides the scanned data from the scanner module (210) to the facsimile module (211) for completing the fax job.

In an embodiment, the other modules can include but are not limited to a notification module. The notification module may be configured to provide a notification after completing each job. In an embodiment, the notification module can provide audio/visual notifications.

Figure 3:
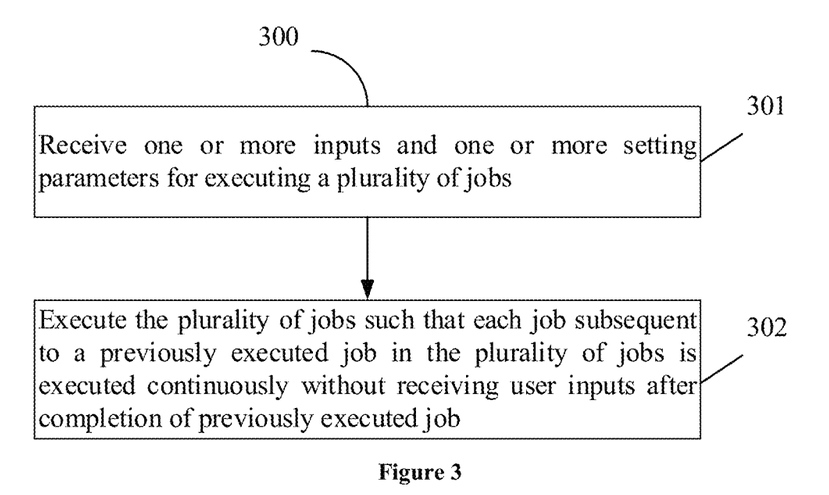
FIG. 3 illustrates an exemplary flowchart for executing multiple jobs in a Multi-Function Printer (MFP), in accordance with some embodiments of the present disclosure.

FIG. 3 is a flowchart illustrating method steps for executing multiple jobs in the NFP (100).

As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Step 301 includes receiving, by the UI (101), one or more inputs and one or more setting parameters (206) for executing the plurality of jobs. In an embodiment, the one or more jobs can include a combination of at least two of a scan job, a print job, a copy job or a fax job (e.g., a scan job and a fax job, a scan job and a copy job, two print jobs and two fax jobs, etc.). In an embodiment, the one or more setting parameters (206) can include a plurality of parameters associated with each job as described above in the present disclosure. In one embodiment, the user provides the one or more inputs for executing the plurality of jobs as a single request. For example, the user can provide an input to perform a copy job followed by a scan job. Here, a single request comprising inputs for executing the plurality of jobs is provided by the user, unlike in conventional MFPs where the user provides multiple requests for each job and each request is provided only after completion of a previous job.

Figure 4A:
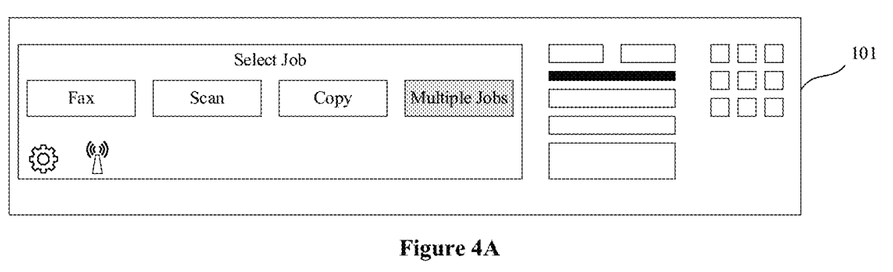
FIG. 4A and FIG. 4B are exemplary illustrations of user interface of a Multi-Function Printer (MFP), in accordance with some embodiments of the present disclosure.
Figure 4B:
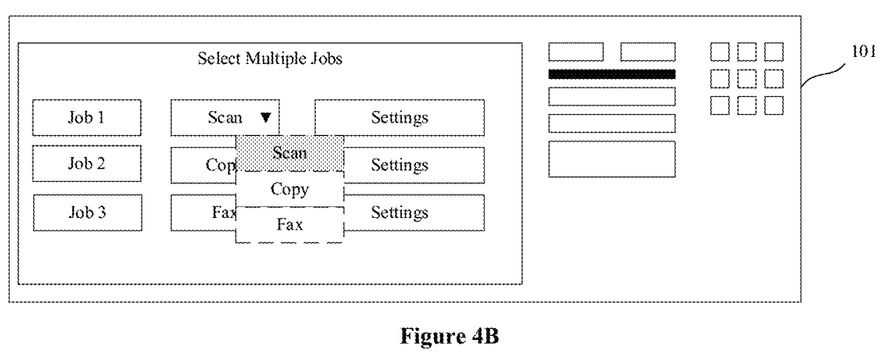

Referring to FIGS. 4A and 4B exemplary illustrations of UI (101) are made. FIG. 4A illustrates the UI (101) showing a screen for selecting jobs. In one embodiment, when the user approaches the MFP (100), the user can either select a single job to be executed or can select the option "multiple jobs." FIG. 4B illustrates the UI (101) showing a screen for selecting the plurality of jobs and the corresponding one or more setting parameters (206). As shown, a dropdown menu can be provided to select the plurality of jobs. Once the job is selected, the corresponding one or more setting parameters (206) can be loaded in the "settings" menu and can be displayed to the user for providing the one or more setting parameters (206). In one embodiment, the UI (101) can prompt the user to provide a priority to each job. The priority can be measured using a priority index (e.g., priority index 1, priority index 2). A job having the priority index 1 may be executed first and so forth.

Figure 5A:
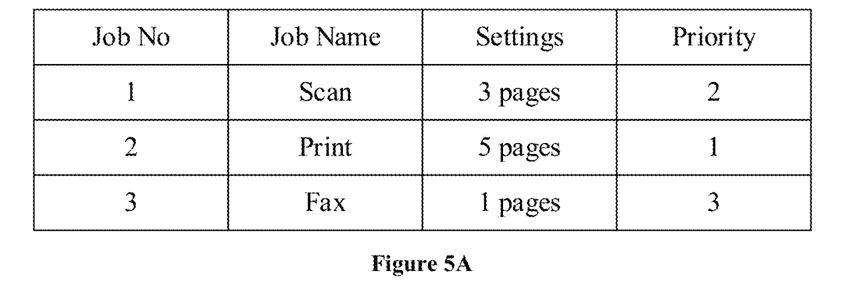
FIG. 5A and FIG. 5B are exemplary illustrations of table stored in a memory of a Multi-Function Printer (MFP), in accordance with some embodiments of the present disclosure.
Figure 5B:
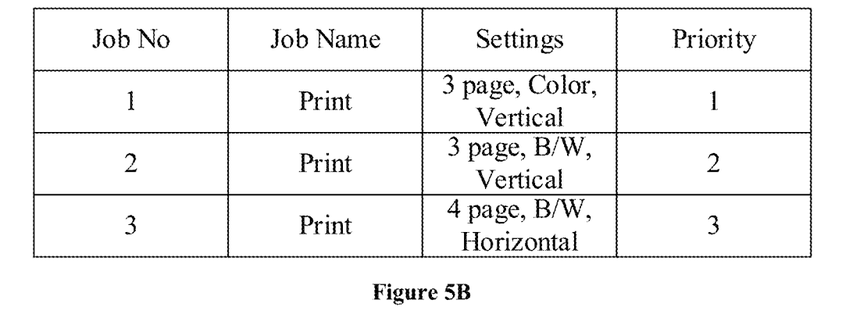

Referring back to FIG. 3, step 302 includes executing, by the processor (203) (e.g., comprising the modules (208)), the plurality of jobs such that each job subsequent to a previously executed job in the plurality of jobs is executed continuously without receiving user inputs after completion of the previously executed job. Consider, for example, a scenario in which the user has provided (a) a single request of executing a copy job followed by a scan job and (b) the one or more setting parameters (206) for the copy job and the scan job. The processor (203) is configured to store the request of executing the copy job followed by the scan job in the memory (202). Referring to FIGS. 5A and 5B, illustrations of a table stored in a memory (202) are shown. As shown in FIG. 5A, a table is shown illustrating storing of the plurality of jobs in the memory (202). As shown, the plurality of jobs (e.g., a scan job, a print job and a fax job) are stored in the table. Also, the setting parameters (206) for each job are also stored in the table. Further, the priority index for each job is stored in the memory (202) as shown in FIG. 5A. In one embodiment user can specify the priority of job execution. For example, if the user has input a print job, a scan job and a fax job, the user can specify the execution order of the jobs. In one embodiment the jobs are executed in sequential order of job submission. In one embodiment the jobs are executed in such a way that power or energy is saved. For example, if the user has submitted a copy job for a 15-page document, a fax job for a 100-page document and then a copy job for a 20-page document, the copy jobs are completed first and thereafter the fax job is executed. As both the copy jobs are executed consecutively, energy can be conserved.

FIG. 5B shows another illustration of storing different setting parameters (206) for a same job. For example, for a document comprising 10 pages, a user can select first three pages to be printed in color and in a vertical orientation, the subsequent three pages to be printed in black and white in a vertical orientation, and the subsequent four pages to be printed in black and white in a horizontal orientation.

Referring back to FIG. 3, the processor (203) fetches the job data (205) and the one or more setting parameters (206) from the memory (202) to complete the copy job and immediately begin with the scan job. In an embodiment, the processor (203) applies the one or more setting parameters (206) while executing the corresponding job. For example, while executing the print job, corresponding setting parameters such as print color, a number of copies, and print orientation are applied. Likewise, while executing a scan job, setting parameters such as scan to email, convert to Portable Device Format (PDF) or image format and the like are applied. Hence the copy job and the scan job are executed continuously without receiving a separate request from the user after completing the copy job. However, in the conventional MFP after completing the copy job, the user would be required to provide a separate request to execute the scan job. In one embodiment, the memory (202) of the MFP (100) can be expanded to enable storing the job data (205). In one embodiment, the memory (202) can also store the one or more setting parameters (206) of each job.

Scenario 1: Single User Executing Plurality of Jobs

Consider a scenario where a single user has approached the MFP (100) and has provided a single request comprising the one or more inputs for executing the plurality of jobs. Let us consider that the user has provided a scan job and a fax job for a 100-page document. Typically, the user would have to wait for one of the scan or the fax job to be completed and thereafter provide instructions for the other job. The MFP (100) of the present disclosure enables the user to provide a single request comprising the one or more inputs for executing both the scan job and the fax job sequentially. Let us consider that the user has selected the scan job to be executed on priority and the fax job to be executed thereafter. Therefore, the user need not wait for the scan job to be completed and provide input for executing the fax job. The user can be notified by the MFP (100) or via the I/O device (103) that both the jobs have been completed.

Scenario 2: Single User Executing a Single Job with Different Setting Parameters Consider a scenario where a single user has approached the MFP (100) and has provided a single request comprising the one or more inputs for executing a single job but with different setting parameters for different pages. Let us consider that the user has provided a print job for a 100-page document. Consider that the user would like to print the first ten pages in color and the subsequent pages in grayscale. Typically, the user would have to provide instructions for printing the first ten pages in color and thereafter provide instructions for printing the subsequent pages in grayscale. The MFP (100) of the present disclosure enables the user to provide a single request comprising the one or more inputs for printing the first ten pages in color and subsequent pages in grayscale and execute the print job for the entire document without receiving user inputs in between. The user can be notified by the MFP (100) or via the I/O device (103) that print job with different setting parameters have been completed.

In a conventional printer, when a user wants to execute a plurality of jobs, the user has to place documents to be scanned for first job on a document feeder at first, and then the user has to place documents to be scanned for second job on the document feeder after the first job has been completed. Upon implementing the aspects of the present disclosure, in the above scenarios, the user can place the documents for both (or a plurality) jobs on the document feeder at one instance and provide instructions for both (or a plurality) jobs together.

In conventional printer systems, before executing each job, MFP resources need to be acquired. After completion of each job, the respective resources are released. Thereafter, for executing a subsequent job, corresponding resources are acquired again. However, in the proposed disclosure, when one or more jobs are input, the one or more resources corresponding to the one or more jobs are acquired. The resources are released only after completion of the one or more jobs. For example, one or more heating units in the MFP (100) may have to generate heat to attain a predefined heat value before executing a job. Typically, when a job is completed, the one or more rollers are cooled down, and when a subsequent job is to be executed, the one or more rollers again generate heat to attain the predefined heat value. However, using the aspects of the present disclosure, as the plurality of jobs are executed continuously, the one or more rollers retain the heat (i.e. the rollers are not allowed to cool down), thus saving power and energy in the MFP (100).

In an embodiment, the present disclosure provides the MFP (100) and a method for executing the plurality of jobs continuously without receiving user inputs after completion of each job. Thus, the user need not approach the MFP (100) after completion of each job to provide instructions for the subsequent jobs.

In an embodiment, different setting parameters can be applied to a single document as a single request. Therefore, an efficient job execution is proposed in the present disclosure.

The terms "an embodiment," "embodiment," "embodiments," "the embodiment," "the embodiments," "one or more embodiments," "some embodiments," and "one embodiment" mean "one or more (but not all) embodiments of the invention(s)" unless expressly specified otherwise.

The terms "including," "comprising," "having" and variations thereof mean "including but not limited to," unless expressly specified otherwise.

The enumerated listing of items does not imply that any or all of the items are mutually exclusive, unless expressly specified otherwise. The terms "a," "an," and "the" mean "one or more," unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERENCE NUMERALS

| Reference number | Description |
| --- | --- |
| 100 | MFP |
| 101 | User Interface |
| 102 | Network |
| 103 | I/O device |
| 201 | I/O interface |
| 202 | Memory |
| 203 | Processor |
| 204 | Data |
| 205 | Job data |
| 206 | Setting parameters |
| 207 | Other data |
| 208 | Modules |
| 209 | Printer module |
| 210 | Scanner module |
| 211 | Facsimile module |
| 212 | Communication module |
| 213 | Other modules |

What is claimed is:

1. A method for executing multiple jobs in a Multi-Function Printer (MFP), comprising:

receiving, by the MFP, (a) a single request comprising one or more inputs for executing a plurality of jobs, the plurality of jobs including at least one of a scan job, a facsimile job, or a copy job, and (b) one or more setting parameters for each of the plurality of jobs; and executing, by the MFP, the plurality of jobs such that each job subsequent to a previously executed job in the plurality of jobs is executed continuously without receiving inputs after completion of the previously executed job, wherein the one or more setting parameters are applied while executing corresponding jobs.

2. The method of claim 1, wherein the plurality of jobs comprises at least two of the scan job, a print job, or the facsimile job.

3. The method of claim 1, wherein the plurality of jobs further comprises a print job, and wherein the one or more setting parameters associated with the print job comprises at least one of a number of pages to be printed, print color, print scaling, print margins, print orientation, and a number of copies.

4. The method of claim 1, wherein the plurality of jobs comprises the facsimile job, and wherein the one or more setting parameters associated with the facsimile job comprises at least one of a number of pages to be faxed, a facsimile address, and a number of copies.

5. The method of claim 1, wherein the plurality of jobs comprises the scan job, and wherein the one or more setting parameters associated with the scan job comprises at least one of a number of pages to be scanned, a file location, an email address, and cloud details.

6. The method of claim 1, wherein the plurality of jobs comprises the scan job, a print job, and the facsimile job;

wherein the one or more setting parameters associated with the print job comprises at least one of a number of pages to be printed, print color, print scaling, print margins, print orientation, and a first number of copies;

wherein the one or more setting parameters associated with the facsimile job comprises at least one of a number of pages to be faxed, a facsimile address, and a second number of copies; and wherein the one or more setting parameters associated with the scan job comprises at least one of a number of pages to be scanned, a file location, an email address, and cloud details.

7. The method of claim 1, wherein the plurality of jobs comprises the copy job.

8. The method of claim 1, wherein a notification is provided after completion of each job while executing the plurality of jobs.

9. The method of claim 1, wherein the plurality of jobs is executed based on a priority index associated with each job.

10. The method of claim 9, wherein the priority index associated with each job is provided by a user through a user interface.

11. A Multi-Function Printer (MFP) for executing multiple jobs, comprising:

a body;

a printer positioned within the body;

a user interface directly coupled to the body and configured to receive (a) a single request comprising one or more inputs for executing a plurality of jobs and (b) one or more setting parameters for each of the plurality of jobs;

a memory; and a processor communicatively coupled with the memory and configured to:

execute the plurality of jobs such that each job subsequent to a previously executed job in the plurality of jobs is executed continuously without receiving user inputs after completion of the previously executed job, wherein the one or more setting parameters are applied while executing corresponding jobs.

12. The MFP of claim 11, wherein the plurality of jobs comprises at least two of a scan job, a print job, or a facsimile job.

13. The MFP of claim 11, wherein the plurality of jobs comprises a print job, and wherein the one or more setting parameters associated with the print job comprises at least one of a number of pages to be printed, print color, print scaling, print margins, print orientation, and a number of copies.

14. The MFP of claim 11, wherein the plurality of jobs comprises a facsimile job, and wherein the one or more setting parameters associated with the facsimile job comprises at least one of a number of pages to be faxed, a facsimile address, and a number of copies.

15. The MFP of claim 11, wherein the plurality of jobs comprises a scan job, and wherein the one or more setting parameters associated with the scan job comprises at least one of a number of pages to be scanned, a file location, an email address, and cloud details.

16. The MFP of claim 11, wherein the processor is configured to provide a notification after completion of each job while executing the plurality of jobs.

17. The MFP of claim 11, wherein the processor is configured to execute the plurality of jobs based on a priority index associated with each job.

18. The MFP of claim 17, wherein the user interface is configured to receive the priority index associated with each job from a user.

19. A non-transitory computer readable medium including instructions stored thereon that when processed by at least one processor cause a device to perform operations comprising:

receiving (a) a single request comprising one or more inputs for executing a plurality of jobs, the plurality of jobs including at least one of a scan job, a facsimile job, or a copy job, and (b) one or more setting parameters for each of the plurality of jobs; and executing the plurality of jobs such that each job subsequent to a previously executed job in the plurality of jobs is executed continuously without receiving inputs after completion of the previously executed job, wherein the one or more setting parameters are applied while executing corresponding jobs.

20. The non-transitory computer readable medium of claim 19, wherein the plurality of jobs is executed based on a priority index associated with each job.

* * * * *